April 1, 1958     B. F. W. HEYER     2,829,336
TEST PROD
Filed July 27, 1953     2 Sheets-Sheet 1
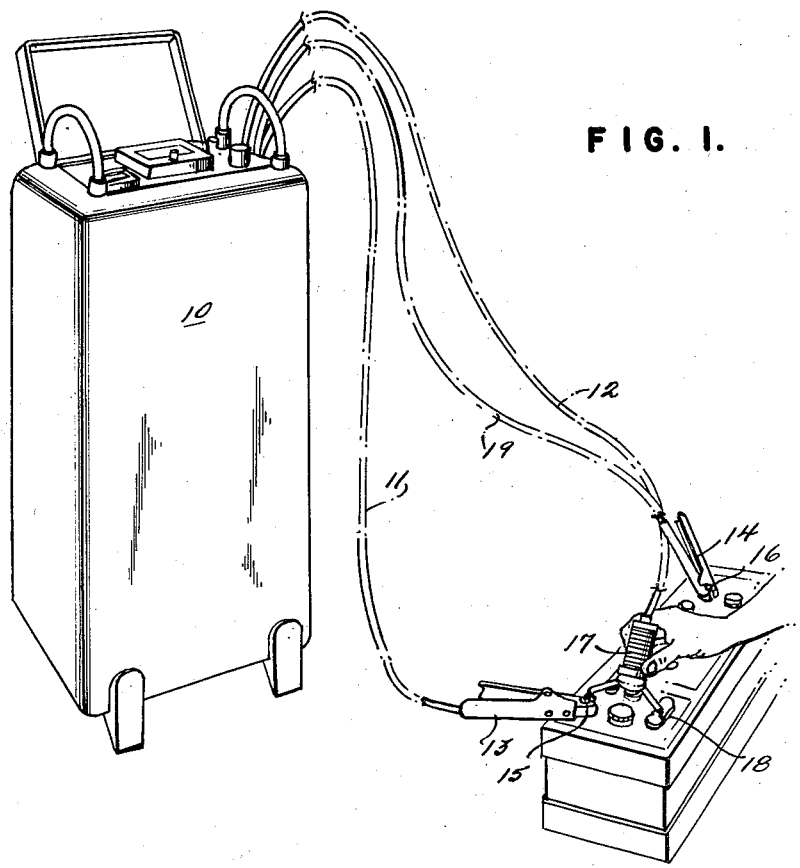
FIG. 1.
FIG. 2
INVENTOR
BENJAMIN F. W. HEYER
BY 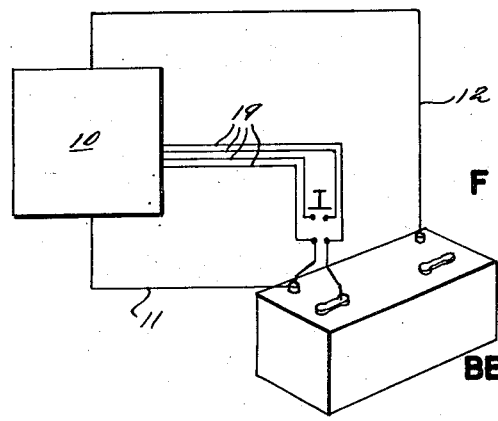
ATTORNEYS April 1, 1958  B. F. W. HEYER  2,829,336
TEST PROD
Filed July 27, 1953  2 Sheets-Sheet 2
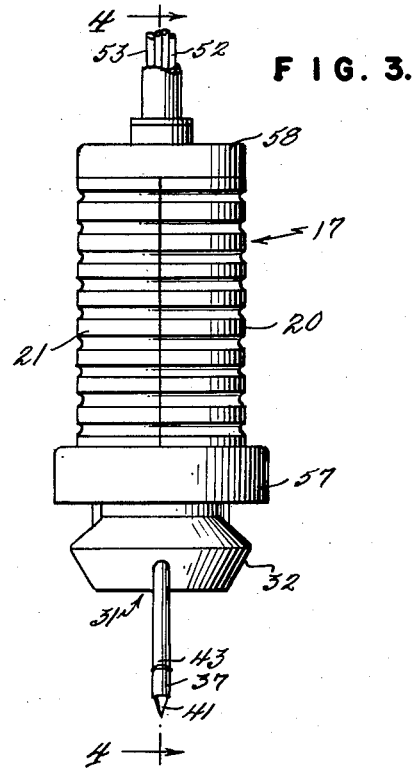
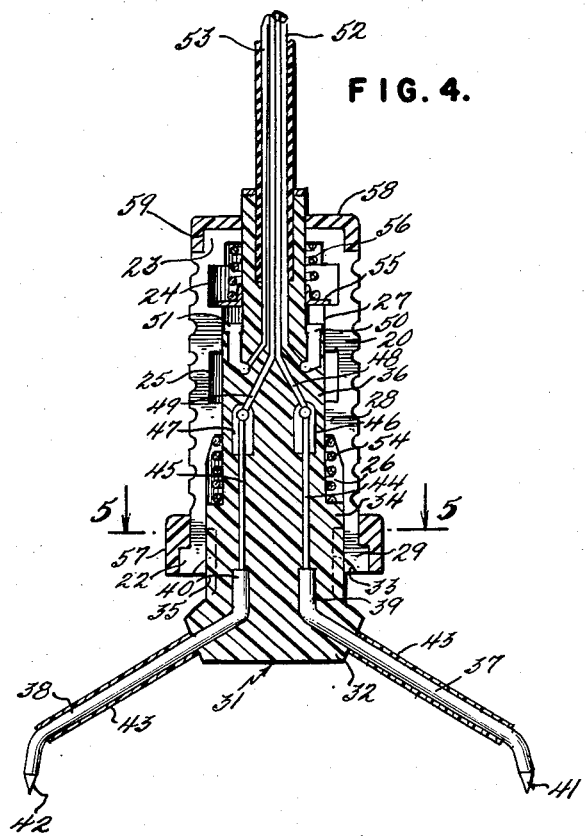
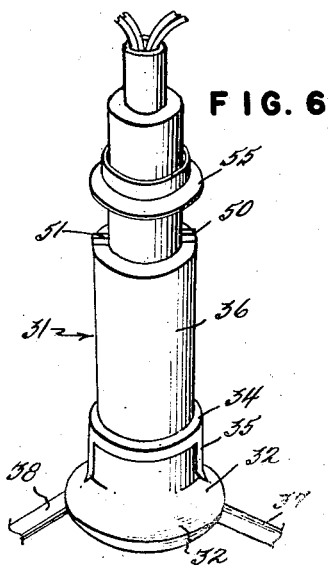
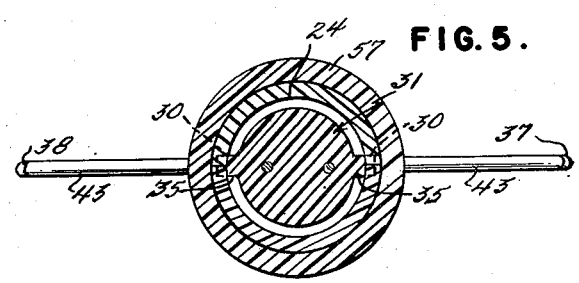
INVENTOR
BENJAMIN F. W. HEYER
Semmes & Semmes
ATTORNEYS

United States Patent Office 2,829,336
Patented Apr. 1, 1958

2,829,336

TEST PROD

Benjamin F. W. Heyer, Greenwich, Conn.

Application July 27, 1953, Serial No. 370,313

2 Claims. (Cl. 324—29.5)

The present invention relates generally to electric measuring or indicating devices and is particularly concerned with apparatus for use in connection with testing the cells of storage batteries to determine condition or degree of charge.

Heretofore, various means have been used for testing the condition of batteries such as "over-all" test of the entire battery and also means have been used for testing individual cells which consist in test prods having a volt meter connected across the terminals thereof.

It has been found that only by individual cell testing under load can a 12 volt battery be accurately tested. An over-all test of such a battery does not show up any individual weaknesses among the six cells. A necessity accordingly exists for providing means for testing individual cells in batteries and particularly 12 volt batteries and this testing must be accomplished under load.

It is accordingly an object of the present invention to provide means for facilitating testing of a single cell in batteries while having a load applied across the entire battery.

A further object of the present invention is to provide means usable with fast battery chargers and which will be automatically operable to connect a pre-selected load from the inside of the charger across the entire battery when the means are applied to the individual cell terminals.

Another object of the present invention is to specifically provide a cell test prod which connects a meter to each cell in turn for reading directly the condition of the cell and which has means whereby a heavy duty contactor inside the battery charger will operate and connect a pre-selected load across the entire battery whereafter the meter gives a true reading of the condition of the individual cell.

A still further object of the present invention is to provide a test prod which is automatically operable while heavy charging cables and clips are still connected to battery terminals to connect a meter to each cell in turn and which will, by means of contact mechanism in the prods, complete a circuit inside the charger whereby a pre-selected load is applied across the entire battery.

An additional object of the present invention is to provide a test prod adapted for universal application in testing various sizes of storage batteries which is of simple and rugged construction, which may be manufactured and assembled in an economical manner and which provides adequate protection for a user against electrical shock.

A still further object of the present invention is to provide a battery test prod or the like which can be easily applied to a battery and by means of which the battery may be quickly and conveniently tested while applying a test load through automatic contact means upon depression of a portion of the test prod.

Further objects and advantages of the present invention will be readily apparent to those skilled in the art from the following detailed description of embodiments of the invention taken together with the accompanying drawings in which:

Fig. 1 is a perspective view showing broadly a battery charging and testing unit and a battery with the interconnecting cables and a test prod in accordance with the present invention being applied to a cell of the battery;

Fig. 2 is a diagrammatic wiring diagram utilizable in the present invention;

Fig. 3 is a side elevational view of the test prod of the present invention;

Fig. 4 is a sectional view taken on line 4—4 of Fig. 3;

Fig. 5 is a sectional view taken transversely along the line 5—5 of Fig. 4; and

Fig. 6 is a partial perspective view of a slidable core member utilized in the present test prod.

It will be understood that throughout the several views of the drawings like reference characters are applied to like parts.

In Fig. 1 of the drawings there is broadly shown at 10 a battery charging unit such as is presently in use. Leading from the battery charging unit 10 are heavy cables 11 and 12 at the ends of which are fixed battery terminal clips 13 and 14 which in the usual manner are attached to the terminals 15 and 16 of a battery to be charged. As is normal when charging a battery, these terminal clips are first attached to the battery terminals and thereafter the charger is actuated to charge the battery.

When such batteries are charged, and particularly when new types of fast rate charges are utilized, it is necessary and desirable to have an accurate check at all times as to the condition or capacity of the battery and to insure that a proper and adequate charge is placed therein. The normal manner of testing such a battery is to utilize a meter for testing voltage or voltage drop across the battery. With the newer 12 volt type battery an over-all reading of the condition is not accurate since such a reading does not indicate any individual cell failures or unsatisfactory conditions. The only satisfactory method of testing such batteries is by testing the individual cells while having a test load applied across the entire battery.

It is desirable for testing of such batteries, as referred to above, to have a simple means connected to and coacting with the battery charger so as to automatically throw a test load onto the over-all battery while permitting a reading of the condition of an individual cell. As shown in Fig. 1 a battery test prod generally designated 17 is applied across the terminals 15 and 18 of an individual cell and has leads 19 which extend from the test prod 17 back to and interconnected in the battery charger 10 in a manner hereinafter set forth.

The battery test prod generally designated as 17 consists of an outer two part casing of which the parts are indicated at 20 and 21. When assembled together they form a cylindrical outer casing having a lower peripheral abutment or flange 22. At the top end of the outer casing consisting of sides 20 and 21 there is an inturned peripheral flange 23 as shown more clearly in Fig. 4. The prod casing formed by the sides 20 and 21 also have peripherally formed or circularly formed spaces or compartments 24, 25 and 26 due to the inner rings 27 and 28 in conjunction with the inturned flange 23.

The lower ring 29 has slots provided therein at diametrically opposed sides as shown at 30.

The prod core generally designated 31 is slidably inserted in the outer casing or prod shell 20, 21. The prod core 31, as shown in detail in Figs. 4, 5 and 6, is a cylindrical member having a lower bell 32 the upper edge of which is coactable with a groove 33 formed at the lower end of the outer shell.

Spaced from the lower bell 32 is an annular ring 34 and extending intermediate the members 32 and 34 are ribs 35 which are slidable in grooves or slots 30. The ribs coact with the grooves to guide the prod core in the outer casing, as will be apparent, upon longitudinal movement of the two members with respect to one another. A smaller cylindrical section 36 having an outer diameter equal to the inner diameter of rings 27 and 28 also facilitate the sliding movement and coact with the rings in the manner of a bearing and sleeve.

The uppermost portion of the prod core 31 is of a smaller circular cross-section as seen in the figures.

The prod core 31 is of a molded construction and is made of any suitable electrical insulating material. Testing prods 37 and 38, formed of a suitable electrical conducting material, consist of base ends 39 and 40 embedded in the material of prod core 31 as seen in Fig. 4. From the base ends, the prod members 37 and 38 extend generally outwardly and terminate in test ends 41 and 42 which are substantially parallel to one another and are pointed in a usual manner. Surrounding the test prods 37 and 38, as shown in Fig. 4, are insulating jackets 43 formed of plastic tubing which extends into the material of prod core 31 and to a close proximity with the test ends 41 and 42. The plastic tubing preferably terminates on the straight section of the prods 37 and 38 where the bends to form the test ends 41 and 42 are formed. Substantially the whole length of test prods 37 and 38 are accordingly insulated exteriorly, leaving exposed only a small portion in proximity to the test ends 41 and 42.

Extending upwardly in the test prod core from the inner or base ends 39 and 40 of the test prods 37 and 38 are leads 44 and 45. Electric terminals of suitable metal are also embedded in the material as shown at 46 and 47 to which the leads 44 and 45 are connected. Attached to the other ends of the terminals 46 and 47 are lead wires 48 and 49 which extend out of the upper end of the prod core and which lead to the tester meter circuit in the charger unit 10. These leads are adapted to be connected into a meter or instrument which will give the condition of an individual cell.

Test load circuit terminals 50 and 51 are also embedded in the material of the prod test core and extend slightly outwardly of the upper end of the cylindrical portion 36 as seen in Fig. 4 and extend into the area formed interiorly of ring 27.

The test load circuit terminals 50 and 51 have connected thereto lead wires 52 and 53 which extend into the battery charger unit 10. The ends of the lead wires 52 and 53 in the battery charger unit are connected into a heavy duty contacter, not shown, inside the charger which is adapted to operate and connect a pre-selected load across the entire battery. It is noted that in normal condition, as shown in Fig. 4, this circuit is broken since there is no connection between the terminals 50 and 51.

A spiral spring 54 is inserted in the compartment 26 and abuts at one end against ring 34 and at the other end against the edge of inner ring 28. This spring, by coacting with the ring members biases the test core to an outer position with respect to the outer shell or casing as will be apparent.

In the upper compartment there is inserted a contact ring 55 which loosely surrounds the upper smaller end of the prod core and which has a flange outwardly extending therefrom which is of a diameter slightly greater than the internal diameter of inner ring 27 so that it is confined in the upper compartment. A spiral spring 56 is interposed between the inturned flange 23 and the collar on contact ring 55 which biases the contact ring into contacting position with the inner ring 27 as shown in Fig. 4.

The casing is secured together, as regards the two halves 20 and 21, by means of a ring 57 which coacts with the external diameter of the shell and the external diameter of the lower flange or abutment 22. This ring 57 is slidable over the entire shell after the two halves have been placed together and the core 31, spring 26, contact ring 55 and spring 56 have been inserted in the proper compartments before the two halves are assembled. At the upper end of the prod there is a cap 58 which coacts with a shoulder 59 formed on the shell. This cap 58 serves to hold the two portions 20 and 21 together at the upper ends so that the over-all prod construction is completed.

When it is desired to test the condition of an individual cell, the test prod is placed on both terminals of an individual cell and the pointed ends 41 and 42 are in contact with these terminals. Thereafter the outer shell is is depressed. The shell will slide down over the exterior of the prod core 31 against the action of springs 54 and 56. When this occurs, the contact ring 55 is brought into contact with the ends of terminals 50 and 51, thereby closing the circuit between these members and accordingly closing the circuit between lead in wires 52 and 53. A circuit through a heavy duty contacter inside the charger is thereby completed so that a pre-selected load is thrown across the entire battery through the heavy leads or cables 11, 12 and by means of terminal clips 13 and 14. When this test load from the tester load circuit is applied on the battery an accurate reading of the true condition of the individual cell will be registered on the meter connected to the leads 19 from the test prod.

The operation and construction of the test prod of the present invention will be readily apparent from the above detailed description taken in conjunction with the drawings. Manifestly, minor changes in the details of construction and/or the materials used in the manufacture thereof will be readily apparent to those skilled in the art to which the present invention pertains without departing from the spirit and scope of this invention as defined in the appended claims.

I claim:

1. A battery testing device for testing cell voltage of individual cells both under load and without load comprising a depressible casing, a prod core slidably mounted in said casing for retraction therein when said casing is depressed, means comprising a closed tester meter circuit when applied to terminals of a cell under test, means in said casing actuatable on depression of said casing comprising a normally open tester load circuit and means for automatically closing said tester load circuit to apply a load to an entire battery when said device is operatively contacted with a battery and said casing is depressed.

2. In a battery testing device for testing cell voltage of individual cells both under load and without load, means comprising a closed tester meter circuit when applied to terminals of a cell under test, means comprising a normally open tester load circuit and means contactable with a battery cell under test including means for automatically closing said tester load circuit to apply a load onto an entire battery when said device is operatively connected with a said battery cell, said normally open tester load circuit including spaced terminals engageable with the load, lead wires connected to said spaced terminals and a contact ring normally spaced from said terminals but actuatable to contact therewith to close the tester load circuit, resilient means biasing said contact ring to the normally spaced position with respect to said terminals.

References Cited in the file of this patent

UNITED STATES PATENTS

| | | |
|---|---|---|
| 1,807,439 | Ryan | May 26, 1931 |
| 2,020,402 | Edwards et al. | Nov. 12, 1935 |
| 2,106,687 | Reetz | Jan. 25, 1938 |
| 2,267,826 | Heyer | Dec. 30, 1941 |
| 2,270,554 | Pugh | Jan. 20, 1942 |
| 2,500,474 | Sperrazza | Mar. 14, 1950 |
| 2,514,745 | Dalzell | July 11, 1950 |
| 2,634,345 | Knight | Apr. 7, 1953 |
| 2,675,522 | Godshalk | Apr. 13, 1954 |